…………………………………………………………………………

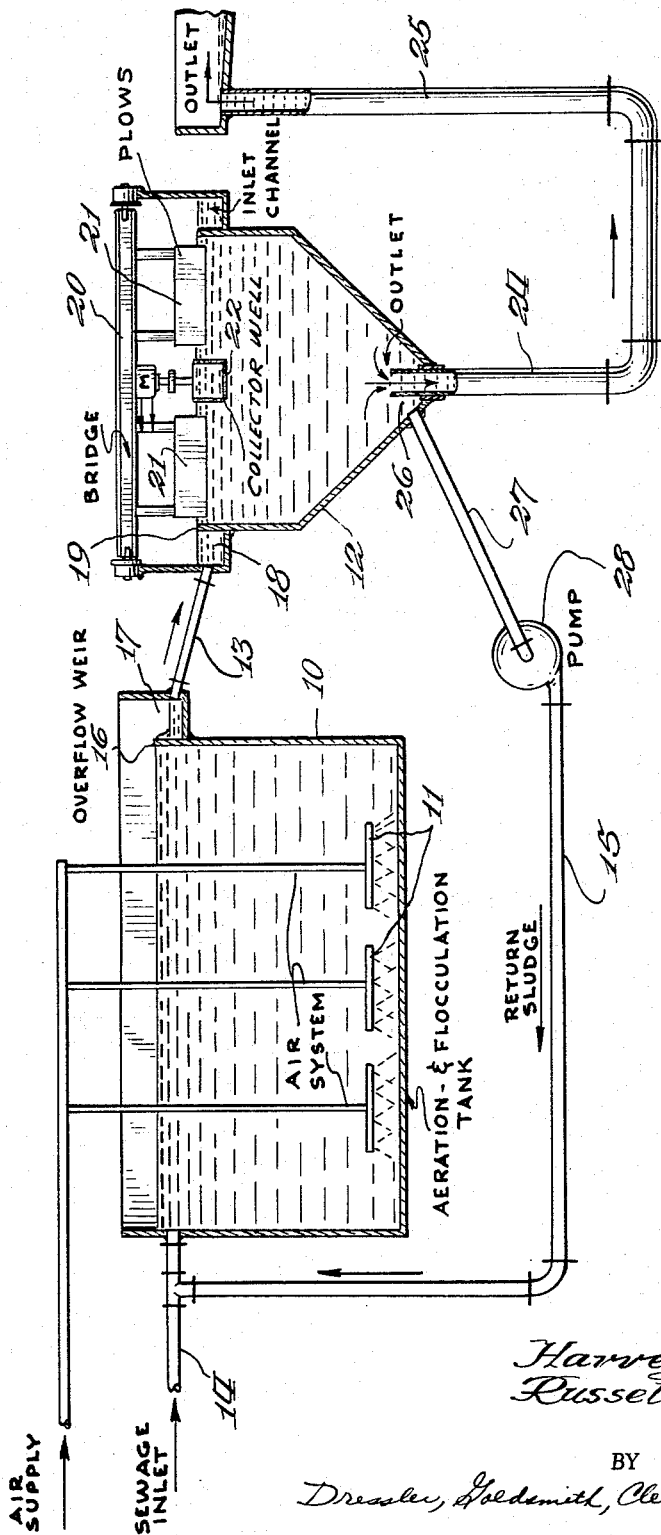

United States Patent Office 3,275,149
Patented Sept. 27, 1966

3,275,149
APPARATUS FOR SEWAGE PRETREATMENT FOR OUTFALL DISPOSAL
Harvey F. Ludwig and Russell G. Ludwig, Arcadia, Calif., assignors to FMC Corporation, a corporation of Delaware
Filed Dec. 5, 1963, Ser. No. 328,258
3 Claims. (Cl. 210—195)

This invention relates to the treatment of waste materials. More particularly, it relates to a method of treatment providing a high capacity process for treatment of domestic and industrial waste. Still more particularly, it relates to apparatus and to a system for rapid conditioning of sewage for disposal at shortened outfall distances from shore.

Briefly, the process of this invention comprises aerating sewage to effect at least partial flocculation, passing aerated sewage to a secondary treatment zone, holding said aerated sewage under quiescent conditions whereby floatables rise to the surface thereof, removing floatables from the aerated sewage in said secondary treatment zone, removing a suspension of solids from said secondary treatment zone and recycling same to the zone of aeration of sewage and discharging the balance of said sewage from the secondary treatment zone through an outfall.

The present design of outfalls, i.e., determination of the length of the outfall for discharge of waste effluent to large water bodies such as to Marine waters, estuaries and lakes, is based virtually completely on the concentration of floatables in the effluent from a sewage treatment plant, especially coliform bacteria which come to the surface of the medium into which they are discharged. For this reason, the length of the outfall is made long enough to assure stabilization in the body of water into which the effluent is discharged to avoid winds and currents bringing the floatables to the shore. Alternatively, elaborate sewage treatment systems are installed where short outfalls are indicated.

According to accepted processes for treatment of the wastes, the sewage or other waste liquid is subjected to preliminary treatment which may consist of screening and/or comminution, and preliminary settling to remove settleable solids, following which the primary effluent or sewage is passed to aeration tanks where the sewage is aerated in the presence of previously formed biological floc, which treatment produces settleable solids in the form of so-called activated sludge.

In such conventional activated sludge processes, sewage is treated in the aerator for a minimum of about six hours. Treatment of this nature reduces the B.O.D. of the sewage and removes most of the floatables before a clarified liquid is discharged from the system. This permits use of an outfall of rather short length, but at a rather high overall cost, however, at less total cost than primary settling and consequent long outfall to avoid objectionable conditions in near-shore waters and public health hazards.

Now it has been discovered that sewage can be stabilized for outfall discharge by a short term aeration operation which may or may not accomplish a reduction in Biological Oxygen Demand (B.O.D.), to render the particulates settleable, said aeration operation being followed by treatment of the aerated material in a secondary zone adapted for efficient removal of floatables which are skimmmed off for return to the aeration operation for further treatment or for disposal by conventional means. A suspension of settleable solids is removed from the secondary zone for recycling to the aeration zone, the recycling quantity being sufficient to sustain the flocculating and biological activity in the aeration chamber. The balance of the treated sewage is discharged to unconfined waters.

In the following specification, the method of treatment is applied to sewage but it should be understood that such a disclosure is merely illustrative of the principle of the invention and there is no intention that the invention be limited thereto.

In general this process of treating sewage comprises introducing comminuted or screened sewage into aeration tanks with recycled sewage solids consisting of suspension of previously aerated sewage. Such suspension may or may not be "activated sludge" depending upon the time of treatment and the extent of aeration being carried out. The mixing of influent sewage with recycle sludge may be accomplished in a premixed operation or simultaneously with the introduction of the second stream into an aeration zone. The process is particularly effective when the loading rate of the aeration tank is in the range between about 200 pounds and 800 pounds of B.O.D. per day per 1000 cubic feet of aerated tank volume, although loading rates outside of this range can be used.

Air is introduced into the body of mixed liquor in the aeration zone in quantities to effect at least a partial flocculation. The quantity of air used need not be sufficient to effect an appreciable reduction in B.O.D. although it will be recognized that aeration in the presence of sufficient recycled solids to maintain or to sustain biological activity in the aeration tank may be continued for periods sufficient to accomplish B.O.D. removal of the order of 50% to 60%.

Treatment of mixed liquor in the aeration zone need only be sufficient to insure some flocculation, i.e., that the discharged particulates not be floatables. As used herein, flocculated material is a term intended to mean solid matter or particulates which will settle when given sufficient time. The aeration treatment may vary from about one third of an hour to three hours, said variation being markedly influenced by the quantity of material recycled to sustain bilogical activity.

After flocculation, the aerated mixed liquor is discharged to a secondary zone or chamber where quiescent conditions are maintained at least at the surface so as to accumulate floatables for skimming off for disposal or return to the aeration zone for further treatment depending upon the character thereof. A useful secondary zone preferably has a large surface area relative to capacity and operates best when there is a good dispersal of influent liquor and a minimum of circulation of liquor adjacent the surface thereof. Aerated mixed liquor introduced into the secondary zone will require a period of from ½ hour to 1½ hours for efficient separation of floatables.

Floatables are skimmed from the surface in the secondary zone. No attempt need to be made to produce a clear supernatant or to overflowing a clear supernatant from the chamber although it will be recognized that with a holding time for example of 1½ hours in the secondary zone, some concentration of solids will take place and a limited amount of supernatant may be available for withdrawal, if desired. Generally, the suspension of solids introduced into the secondary zone minus the flotables, is removed as an underflow and is separated, with or without concentration into a recycle portion for mixing with the influent sewage and the remainder to be discharged with the underflow.

The amount or volume of sludge recycled will depend upon the quantity or character of the influent sewage. Usually, secondary zone underflow would be returned at rates calculated on the basis of the influent sewage of between about 10% and 40% of the sewage flow. Introduction of recycled secondary zone underflow into the system in the proposed ratio to maintain a more or less constant density of activated sludge in the aeration chamber will cause the treatment and stabilization to proceed efficiently.

All excess sludge over the requirements for recycle are discharged to the outfall, there being no need for any sludge digester of the anaerobic type used in conventional plants or for incinerators to burn up dewatered sludge, etc.

The new process of sewage treatment will be best understood from the following description given by way of examples.

*Example*

A sewage treatment plant having 625,000 cubic feet of aerator volume when operating with 30 million gallons per day flow of raw sewage, has a loading rate of about 600 pounds of B.O.D. per day per thousand cubic feet of aerator capacity. The raw sewage plus recycled suspension of sludge in a volume of 15% would be aerated for a period of about one-half hour. The air introduced in that period in cubic feet per gallon in this system is approximately 0.3. At the stated rate of processing, the suspension is discharged to the secondary chamber at a flow rate of about 3000 gallons per square foot per day. In the secondary tank of 115 feet diameter, at the surface approximately 80% to 90% of the floatables are removed.

Apparatus for carrying out the process as illustrated in the drawing comprises a holder 10 or aeration tank for a mass of sewage matter having appropriate diffuser means 11 for introducing air, etc., a skimming tank 12 for treating appreciable quantities of aerated mixed liquor, means 13 for movement of treated sewage from the holder to said skimming tank 12, means for removing floatables from the surface of the treated sewage in said skimming tank, means 15 for recycling a portion of the suspension of solids from the skimming tank to said holder and means 24 for discharging the suspension of solids as an underflow from the skimming tank to unconfined waters.

Sewage enters holder 10 through inlet pipe 14 after suitable treatments which may include screening and comminution. Aerated material overflows a weir 16 into collection channel 17 from which it is delivered by suitable piping, conduit, etc. to skimming tank 12.

Apparatus particularly adapted for the skimming operation is schematically illustrated in the drawing. The skimming tank 12 illustrated is of inverted truncated cone configuration, although tanks of other configuration may be utilized, adapted to provide a surface settling rate in the range between 1000 and 3000 gallons per square foot per day. Aerated mixed liquor from the aeration tank is introduced into the skimming tank through a peripheral inlet channel 18 from which the liquor overflows a weir 19 into a main body of treated sewage. The skimming tank 12 is provided with a bridging member 20 supported from the peripheral rim of said conical tank which bridging member has suspended therefrom suitable means 21 such as plows to move floatables to a centrally located collection well 22, preferably supported from said bridge member, but also supportable from said tank, if so desired. Solid material and liquid collected in said well is discharged from suitable means as by sludge pump for disposal as by incinerator, etc.

The outlet for solids suspension from the conical skimming tank 12 is at the small bottom thereof. The bottom of the tank communicates with a conduit 24 adapted with a riser portion 25 of sufficient height to act as an automatic controller of water level in said skimming tank. Sludge to be recycled to the aeration tank may be withdrawn from the conduit but, as illustrated in the drawing, the conduit 24 projects internally a short distance above the bottom of the tank 12 to provide a sump 26 wherein a more concentrated suspension of solids may be accumulated. A pipe 27 communicates at one end with the sump 26 and at the other end with the intake to a slurry pump 28 which moves the suspension of solids through pipe 15 to the influent conduit 14 delivering sewage to the aeration tank 10.

The instant process produces treated sewage of a character permitting savings of 20% to 50% of overall treatment plant and outfall costs. As compared to a conventional primary plant with outfall, the savings accrue from simplification of plant through elimination of sludge digestion and processing facilities and from reduction of outfall length.

As compared to a conventional complete treatment plant with outfall, the savings are derived from simplification of the plant through elimination of sludge digestion and processing facilities and from simplification of design of the secondary chambers since solids settling considerations are not critical design factors.

Numerous modifications may be made in the preferred process of the new invention as above described without deviating from the broader generic aspects thereof, for example, numerous modifications may be made in the secondary chamber such as introduction of influent by means of a distributor mounted at the central axis of the conical tank and removal of the floatables from the periphery of the tank. In another modification, a closed peripheral influent channel adapted with a submerged inlet to the skimming tank may have mounted above it a peripheral channel into which skimmings may be discharged.

We claim:

1. Apparatus for treatment of sewage for outfall disposal which comprises a holder for a mass of sewage matter, air dispersing means positioned below the normal liquid level in said holder, a conduit for introducing influent sewage into said holder, a skimming tank of inverted truncated cone configuration spaced exteriorly of said holder, a peripheral influent channel at the top of said conical skimming tank, conduit means interconnecting said holder and said peripheral channel for movement of aerated sewage from said holder to said peripheral channel, means for flowing aerated sewage from said channel into said skimming tank, means for removing floatables from the surface of the aerated sewage in said skimming tank, conduit means communicating with the small end of said conical skimming tank for withdrawing and disposing of a suspension of solids therefrom and means for returning a portion of the suspension of solids from said skimming tank to a zone of mixing with influent sewage being introduced in said holder.

2. Apparatus for treatment of sewage for outfall disposal which comprises a holder for a mass of sewage matter, air dispersing means positioned below the normal liquid level in said holder, a conduit for introducing influent sewage into said holder, a skimming tank of inverted truncated cone configuration, a peripheral influent channel at the top of said conical skimming tank, means for flowing aerated sewage from said channel into said skimming tank, a collection well for floatables centrally located in said skimming tank, means rotatable about the central axis of said tank for moving floatables to said collection well, means for withdrawing and disposing of floatables collected in said well, conduit means communicating with the small end of said conical skimming tank for withdrawing and disposing of the suspension of solids therefrom and means for returning a portion of the suspension of solids from said skimming tank to a zone of mixing with influent sewage being introduced in said holder.

3. Apparatus for treatment of sewage for outfall disposal which comprises a holder for a mass of sewage matter, air dispersing means positioned below the normal liquid level in said holder, a conduit for introducing influent sewage into said holder, a skimming tank of inverted truncated cone configuration, a peripheral influent channel at the top of said conical skimming tank, means for movement of aerated sewage from said holder to said peripheral channel, means for flowing aerated sewage from said channel into said skimming tank, means for removing floatables from the surface of the aerated sewage in said skimming tank, conduit means extending internally and communicating with the small conical end of said tank for withdrawing and disposing of a suspension of solids therefrom, said conduit means having an open end disposed above the lowermost portion of said tank, the portion of said tank between said conduit means projecting into said tank and the tank wall below said open end of said conduit means providing a concentration zone for solids of limited volume, and means for withdrawing concentrated solids suspension from said zone of limited volume and returning said solids suspension from said skimming tank to a zone of mixing with influent sewage being introduced in said holder.

References Cited by the Examiner
UNITED STATES PATENTS
2,098,463  11/1937  Morehead _____ 210—525
3,173,866  3/1965  Lefton et al. _____ 210—14 X

OTHER REFERENCES

Metcalf et al.: American Sewerage Practice, vol. III, Disposal of Sewage, Third edition, 1935, McGraw-Hill, New York, pp. 205–210, 570–573 and 620–621.

Torpey et al.: Effects of Aeration Period on Modified Aeration, Jour. San. Eng. Div., Proc. Amer. Soc. Civ. Engrs., 84, No. SA 3, Paper 1681 (1958), 15 pp.

Von der Emde: Aspects of the High Rate Activated Sludge Process, appearing at pp. 299–317 of Advances in Biological Waste Treatment, edited by Eckenfelder et al., 1963, MacMillan Co., New York.

MORRIS O. WOLK, *Primary Examiner.*

MICHAEL E. ROGERS, *Examiner.*